United States Patent

Chart et al.

[15] 3,647,363
[45] Mar. 7, 1972

[54] RECOVERY OF SULFUR VALUES FROM FLUE GASES WITH OXIDIZED NEUTRAL SULFITE GREEN LIQUOR

[72] Inventors: Nallan C. S. Chari, Valdosta, Ga.; Kermit E. Olson, Tomahawk, Wis.; Philip E. Shick, Toledo, Ohio

[73] Assignee: Owens-Illinois, Inc.

[22] Filed: Aug. 6, 1969

[21] Appl. No.: 847,966

[52] U.S. Cl.....................23/25 Q, 23/48, 23/129, 162/29, 162/36
[51] Int. Cl......................D21c 11/06
[58] Field of Search..........162/30, 33, 35, 29, 36; 23/48, 23/129, 130, 2 SQ

[56] References Cited

UNITED STATES PATENTS 2,788,273  4/1957  Shick.........................162/36
3,165,378  1/1965  Greenawalt..................23/129

Primary Examiner—S. Leon Bashore
Assistant Examiner—Alfred D'Andrea, Jr.
Attorney—Paul L. Sabatine and Edward J. Holler

[57] ABSTRACT

A process for the utilization of sulfur compounds in spent pulping liquors and flue gases, said process including the oxidation of neutral sulfite green liquor with air or oxygen under heat and pressure to form an alkaline solution containing sodium sulfate, sodium thiosulfate, sodium sulfite, sodium hydroxide and sodium carbonate, suitable for recovery of sulfur dioxide from flue gases to obtain a product liquor suitable for use in a pulping process.

5 Claims, 3 Drawing Figures

RECOVERY OF SULFUR VALUES FROM FLUE GASES WITH OXIDIZED NEUTRAL SULFITE GREEN LIQUOR

BACKGROUND OF THE INVENTION

1. Field of the Invention

The present invention pertains to a novel system for both the recovery of useable chemicals and the reduction of the air pollution from flue gases produced in a neutral sulfite pulping process. In particular, the invention concerns a physiochemical process for the recovery of useful sulfur-containing compounds and to the reduction of unwanted air pollution from flue gases of chemical recovery and/or power boilers employed in neutral sulfite pulping mills. Specifically, the patentable invention provides a means for the recovery and conservation of sulfur and sulfur-type compounds from neutral sodium base sulfite pulping liquors by a combustion step to give an oxidizable green liquor, which is oxidized in a later step to supply alkali for the scrubbing of power boiler flue gases to remove and recover sulfur-type products therefrom.

2. Description of the Prior Art

In the prior art, various methods have been advanced relating to scrubbing devices and the use of green liquor for scrubbing flue gases. For example, in U.S. Pat. No. 2,772,240, patentees Trobeck et al., treat the green liquor obtained in a sulphate cellulose process by the oxidation of sulphide sulphur to give thiosulphate sulfur which is inactive in a cooking liquor. That is, Trobeck did not get any sulfite. Another patent directed towards the same problem is U.S. Pat. No. 2,642,336 issued to patentee Greenawalt. Patentee Greenawalt discloses a prior art process that does not employ any tower and requires that the undesirable multiconversion step process of converting sulphide to sulphite through a thiosulfate, and the need for an added step of oxidizing the thiosulfate to sulfite. Greenawalt in the patent suggests a process that involves the dry conversion of sulfide to sulfite but does not suggest the use of any step or process to give hydroxides and sulfates. In U.S. Pat. No. 2,717,825, patentee Greenawalt set forth an apparatus for carrying out the process of U.S. Pat. No. 2,642,336; however, the apparatus patent also fails to use a tower and a wet process step like the latter process patent. In U.S. Pat. No. 3,165,378 is set forth an oxidation process that requires specific temperature ranges, regulated pressures and a reaction vessel packed with steel balls, which converts sodium sulfide primarily to sodium sulfite. Other prior art gas-scrubbing processes using varying amounts of green liquor often lead to excessive hydrogen sulfide evolution and pollution and also to excessive formation of pulping inactive sodium thiosulfate by the reaction of the sulfur dioxide with the sulfide present in the green liquor. The present invention overcomes the prior art presently unwanted features discussed above by essentially reducing or essentially eliminating the evolution of undesirable hydrogen sulfide and also the unwanted conversion of absorbed sulfur dioxide into inactive thiosulfate; that is, the subject invention produces useful recovery pulping products and tends to avoid pollution problems.

SUMMARY OF THE INVENTION

It has now been unexpectedly found that an improved and novel process advanced to the pulping art consisting of a combination of steps suitable for use in a neutral sodium base sulfite mill with the chemical recovery of sulfur dioxide from either the boiler flue gases or power boiler flue gases, and the oxidation of sodium sulfide under pressure and elevated temperatures to form a mixture of sodium hydroxide, sodium thiosulfate, sodium sulfate and sodium carbonate, can easily be effected for the set forth purposes of reducing and/or eliminating air pollution by gasses like sulfur dioxide and for the purpose of producing from spent sulfur-containing chemicals by oxidation useful sulfur-containing pulping compounds.

THE DRAWINGS

In the accompany drawings are illustrated the results obtained with the present invention. FIG. 1 illustrates results using an initial oxygen charge corresponding to 215 percent of that required for the oxidative conversion of neutral sulfite green liquor to $Na_2SO_3$. FIG. 2 illustrates the results obtained for an initial oxygen charge corresponding to 200 percent of that theoretically required for the conversion of $Na_2S$ in a neutral sulfite green liquor to $Na_2SO_3$. FIG. 3 illustrates the percent conversion of $Na_2S$ with 90 percent of the theoretical oxygen as a function of time and temperature.

DESCRIPTION OF EMBODIMENTS

The Chemical Reactions

Figure 1:
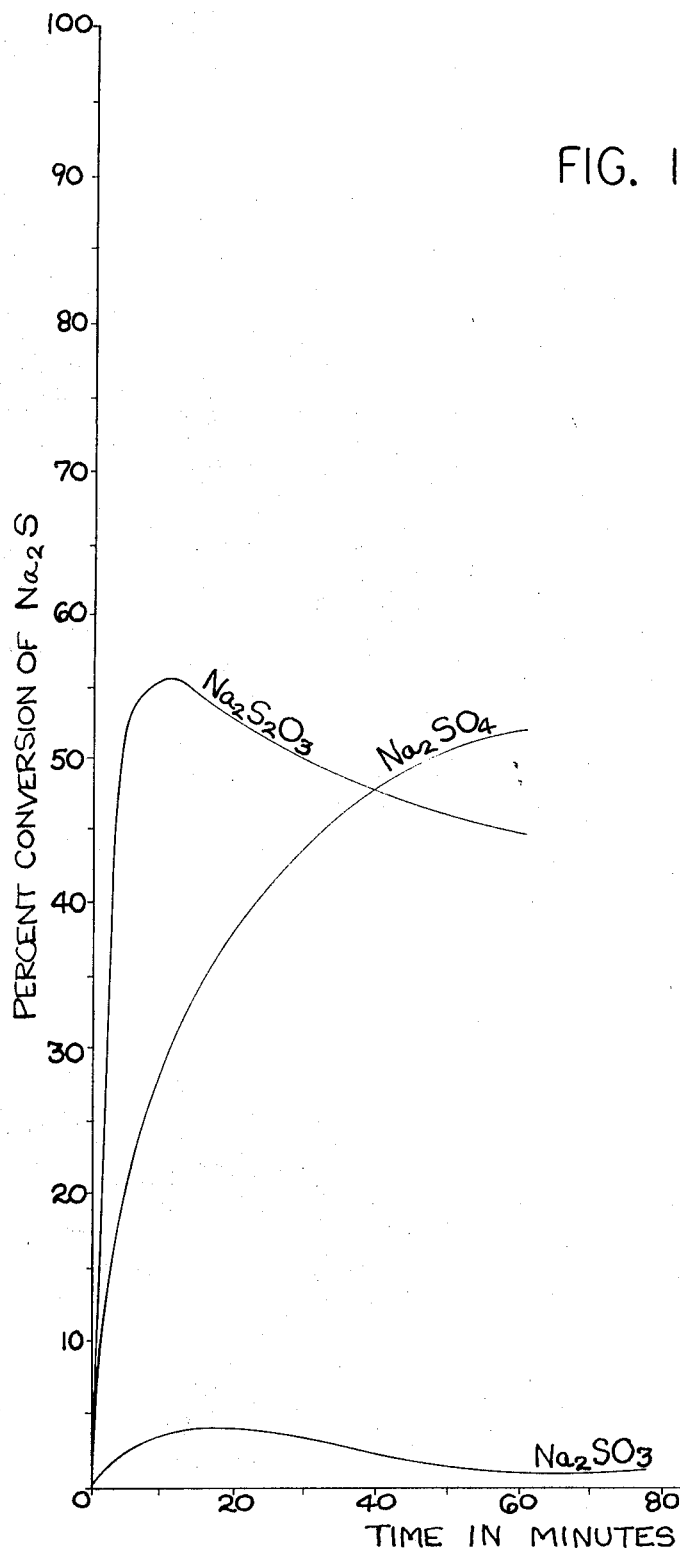
Figure 2:
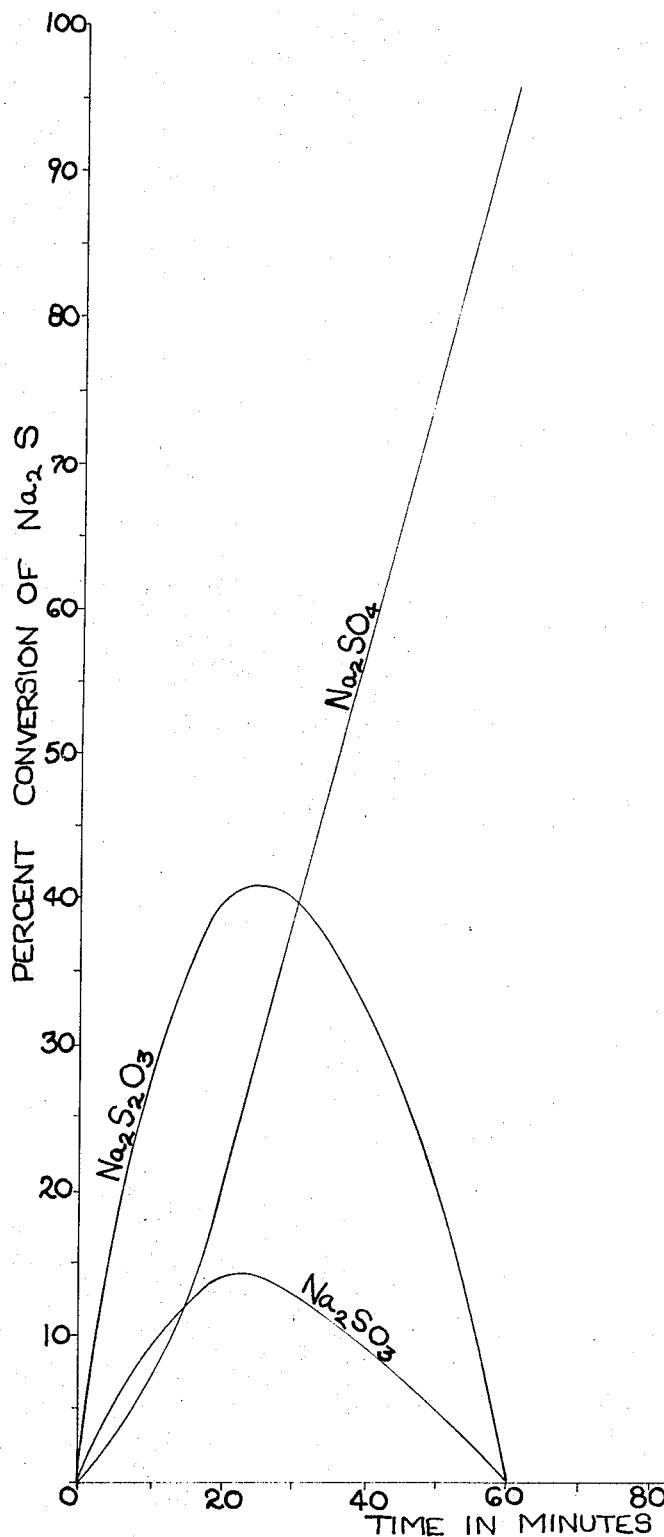
Figure 3:
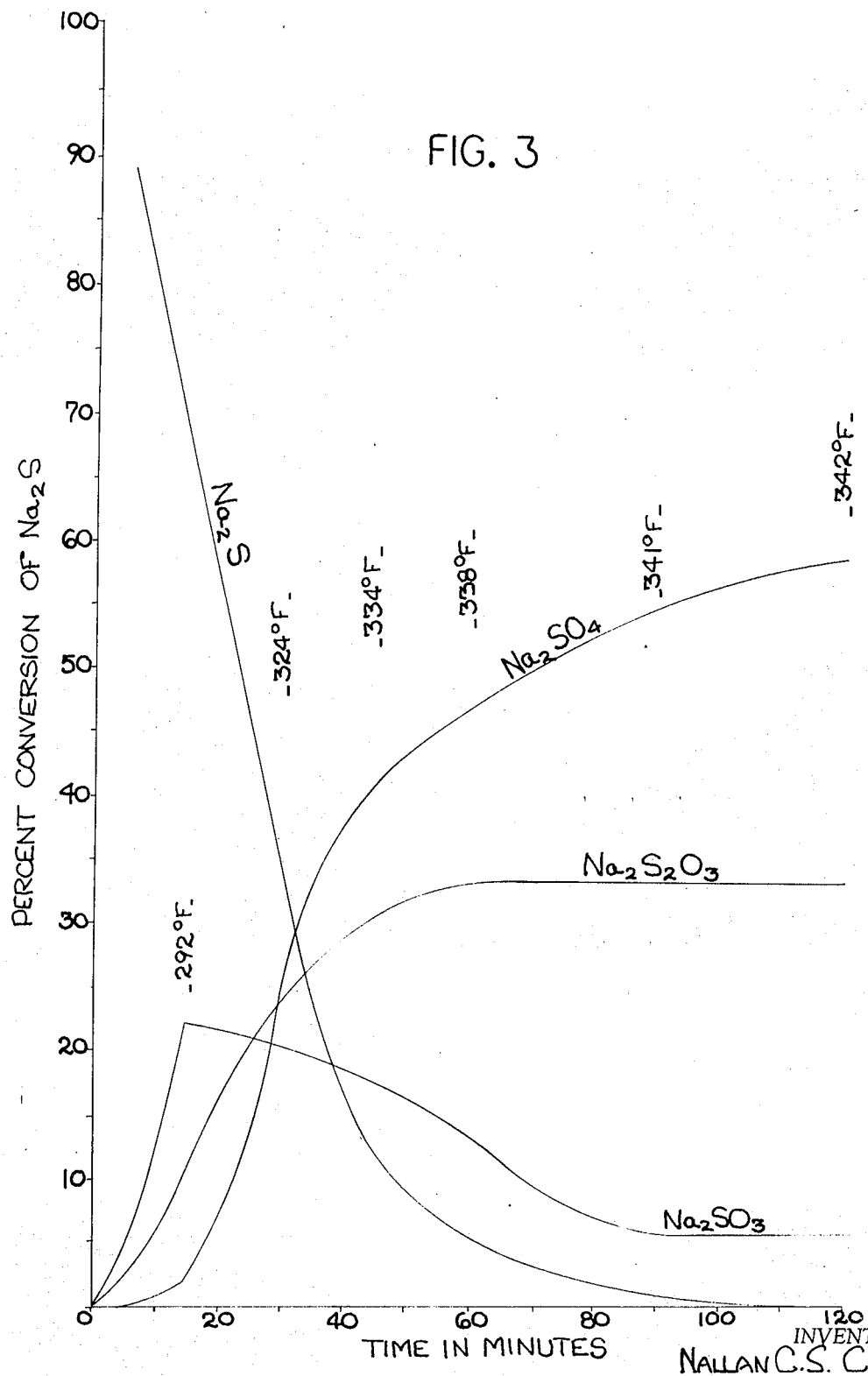

A desired objective of the pulping industry is to use green liquor, containing sodium sulfide ($Na_2S$) and sodium carbonate ($Na_2CO_3$), for the effective removal of sulfur dioxide ($SO_2$) from flue gasses by the reaction of the sulfur dioxide with carbonate according to the desired reactions as set forth in Equations (1) and (2):

1. $Na_2CO_3 + SO_2 + H_2O \rightarrow Na_2SO_3 + 2\ NaHCO_3$
2. $2NaHCO_3 + SO_2 \rightarrow Na_2SO_3 + 2CO_2 + H_2O$ However, at the same time the reaction of equations (1) and (2) occur, the sodium sulfide ($Na_2S$) present in a given green liquor reacts to liberate the air gaseous pollutant hydrogen sulfide ($H_2S$) as shown in Equations (3) and (4):

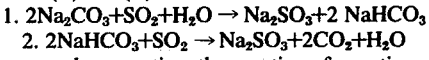

3. $2Na_2S + SO_2 + H_2O \rightarrow Na_2SO_3 + 2\ NaHS$
4. $2NaHS + SO_2 \cdot zH_2O \rightarrow Na_2SO_3 + 2\ H_2S$ The carbon dioxide in the flue gases will also react with the sulfide present to form bicarbonate ($HCO_3^-$) and liberate hydrogen sulfide as depicted in Equations (5) and (6):

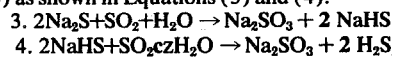

5. $Na_2S + CO_2 + H_2O \rightarrow NaHS + NaHCO_3$
6. $NaHS + CO_2 H_2O \rightarrow NaHCO_3 + H_2S$ Then, the liberated hydrogen sulfide will react with sulfur dioxide to form sulfur which, in the presence of sodium sulfite, will form sodium thiosulfate ($Na_2S_2O_3$) as demonstrated Equations (7) and (8):

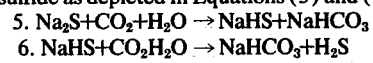

7. $2H_2S + SO_2 \rightarrow 3S + 2H_2O$
8. $Na_2SO_3 + S \rightarrow Na_2S_2O_3$ The cumulative effect of the reactions set forth in the above equations is the resultant expressed in Equations (9) and (10). In these latter two equations two molecules of sodium sulfide deactivate four molecules of sulfur dioxide and one or more of sodium carbonate to form three molecules of sodium thiosulfate and one of carbon dioxide.

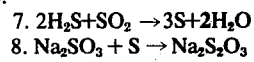

9. $2Na_2S + 4\ SO_2 + 2Na_2CO_3 + H_2O \rightarrow 3Na_2S_2O_3 + 2NaHCO_3$
10. $2Na_2S + 4\ SO_2 + Na_2CO_3 \rightarrow 3Na_2S_2O_3 + CO_2$ It can thus be seen from the above equations that the use of green liquor by the prior art for the scrubbing of flue gases to remove sulfur dioxide often leads to air pollution with hydrogen sulfide and/or the loss of sulfur dioxide and alkali by converting these to inactive thiosulfate which is essentially of no value in a cooking liquor. Now, according to the spirit of the present invention, by the oxidation of green liquor prior to its use as a scrubbing fluid, the sodium sulfide is converted to innocuous pulping constituents according to the equations below:

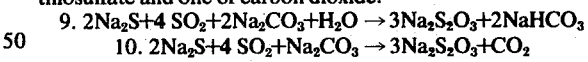

11. $2Na_2S + 2O_2 + H_2O \rightarrow Na_2S_2O_3 + 2NaOH$
12. $Na_2S + 2O_2 \rightarrow Na_2SO_4$ These products do not react with the absorbed sulfur dioxide to form more thiosulfate; but, the caustic will provide additional alkali for absorption. The sulfide can also be converted according to the spirit of the present invention by the oxidative reaction set forth in Equations (13) and (14) to give the desirable and useful sulfite by the further oxidation of the inactive thiosulfate or directly as follows:

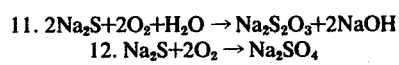

13. $Na_2S_2O_3 + 2NaOH + O_2 \rightarrow 2Na_2SO_3 + H_2O$
14. $2Na_2S + 3O_2 \rightarrow 2Na_2SO_3$ Further, in accord with the mode and manner of the present invention it has been found that the oxidation of green liquor can be accomplished in a recirculating batch reactor in which

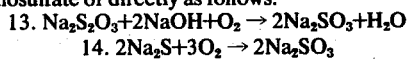

the green liquor is sprayed over marbles and the like in the presence of oxygen under an initial partial pressure of approximately 20 to 80 pounds per square inch (p.s.i.) and at a temperature of approximately 300° to 350° F. and for a reaction time of for 10 minutes to about 120 minutes.

Representative embodiments of the invention are set forth in the following examples and it is to be understood that the examples are merely representative of the spirit of the invention and they are not to be construed as limiting the invention as these and other methods will be obvious from the instant examples and disclosure to those skilled in the art.

EXAMPLE 1

A liquor digester having a volume of 1.550 cubic feet was first packed with 2 liters of commercially available marbles having a diameter of ½ inch and 0.25 cubic feet of green liquor was added. Next, the air was purged with oxygen and oxygen was fed into the digester until the digester pressure was about 80 p.s.i.g. This pressure corresponds to 50 percent excess of the theoretical oxygen requirement for the conversion of sodium sulfide to sodium sulfate. Then, fresh steam at 170 p.s.i.g. was admitted into the jacket of digester and the green liquor was circulated in the digester. An analysis was made on the liquor at various times to show that the following reactions were taking place in the digester:

15. $2Na_2S + 2O_2 + H_2O \rightarrow Na_2S_2O_3 + 2NaOH$
16. $3Na_2S_2O_3 + 6NaOH \rightarrow 4Na_2SO_3 + 2Na_2S + 3H_2O$
17. $Na_2S_2O_3 + 2NaOH + O_2 \rightarrow 2Na_2SO_3 + H_2O$ The analysis of the results clearly indicate that the present process utilizes the caustic formed to act upon the thiosulfate in accordance with Equations (16) or (17). In the Table 1 below is set forth the results of the oxidation of a green liquor from a neutral sodium sulfite pulping process. The composition of the green liquor is set forth as "component" expressed as the equivalent pounds of $Na_2O$ per gallon of feed green liquor. The rate of oxidation of the feed and the appearance of other chemicals in the digester is set forth at time interval analysis periods of 15 minutes, 30 minutes, 45 minutes, and 60 minutes. The results in Table 1 are in pounds per gallon of $Na_2O$ and the results in Table 2 are in mole percentage as $Na_2O$.

TABLE 1

| Component | Feed lb./gal. | Oxidation Time in Minutes | | | |
|---|---|---|---|---|---|
| | | 15 | 30 | 45 | 60 |
| $Na_2S$ | 0.208 | 0.014 | 0.005 | 0.007 | 0.005 |
| $Na_2S_2O_3$ | 0.010 | 0.082 | 0.065 | 0.065 | 0.062 |
| $Na_2SO_3$ | 0.004 | 0.014 | 0.012 | 0.008 | 0.007 |
| $Na_2CO_3$ | 0.325 | 0.350 | 0.360 | 0.364 | 0.367 |
| $Na_2SO_4$ | 0.000 | 0.074 | 0.097 | 0.108 | 0.116 |
| NaOH | 0.000 | 0.034 | 0.038 | 0.037 | 0.031 |
| | 0.547 | 0.568 | 0.577 | 0.589 | 0.588 |

TABLE 2

| Component | Feed molar % $Na_2O$ | Oxidation Time in Minutes | | | |
|---|---|---|---|---|---|
| | | 15 | 30 | 45 | 60 |
| $Na_2S$ | 38.02 | 2.44 | 0.87 | 1.19 | 0.85 |
| $Na_2S_2O_3$ | 1.83 | 14.25 | 11.26 | 11.04 | 10.54 |
| $Na_2SO_3$ | 0.73 | 2.44 | 2.08 | 1.36 | 1.19 |
| $Na_2CO_3$ | 59.41 | 61.70 | 62.44 | 61.76 | 62.41 |
| $Na_2SO_4$ | 0.00 | 13.10 | 16.75 | 18.30 | 19.80 |
| NaOH | 0.00 | 6.07 | 6.60 | 6.35 | 5.21 |
| | 100.00 | 100.00 | 100.00 | 100.00 | 100.00 |

The results set forth in Tables 1 and 2 were obtained during an oxidation temperature range of 320° F. to 340° F. and over a pressure range of 90 p.s.i.g. to 102 p.s.i.g.

EXAMPLE 2

In the present example, 7.1 liters of green liquor from combustion of a sulfite base pulping liquor were introduced into the digester and the liquor was oxidized over a 0 to 120 minute time period. The temperature and the pressure of the oxygen was measured at various times and the results are set forth in Table 3. The oxygen charge corresponded to 90 percent of the theoretical charge for conversion of all of the $Na_2S$ to $Na_2SO_3$ or 67.5 percent of that required to convert it to $Na_2SO_4$.

TABLE 3

| Time of analysis minutes | Temp. °F. | Pressure P.S.I.G. |
|---|---|---|
| 0 | 71 | 24 |
| 5 | 210 | 50 |
| 15 | 293 | 82 |
| 30 | 325 | 97 |
| 45 | 334 | 98 |
| 60 | 338 | 98 |
| 90 | 341 | 100 |
| 120 | 342 | 101 |

In Table 4, immediately below is set forth the original components in the neutral sulfite green liquor and their conversion to other components as measured at the various time periods set forth. The results in Table 4 are as pounds per gallon of $Na_2O$.

TABLE 4

| Components | Oxidation time in minutes | | | | | | |
|---|---|---|---|---|---|---|---|
| | 0 | 15 | 30 | 45 | 60 | 90 | 120 |
| $Na_2S$ | 0.193 | 0.153 | 0.072 | 0.026 | 0.009 | 0.003 | 0.000 |
| $Na_2S_2O_3$ | 0.036 | 0.054 | 0.083 | 0.098 | 0.103 | 0.108 | 0.103 |
| $Na_2SO_3$ | 0.010 | 0.048 | 0.041 | 0.037 | 0.030 | 0.012 | 0.012 |
| $Na_2CO_3$ | 0.054 | 0.054 | 0.549 | 0.549 | 0.549 | 0.549 | 0.546 |
| NaOH | | | | | 0.005 | 0.008 | 0.010 |
| $Na_2SO_4$ | | 0.004 | 0.054 | 0.089 | 0.103 | 0.119 | 0.128 |
| Total | 0.779 | 0.799 | 0.799 | 0.799 | 0.799 | 0.799 | 0.799 |

The percentage of products on the basis of original sulfide present in the liquor feed are set forth in Table 5, with essentially all oxygen being consumed during the run.

TABLE 5

| Component | Time in minutes | | | | | | |
|---|---|---|---|---|---|---|---|
| | 5 | 15 | 30 | 45 | 60 | 90 | 120 |
| $Na_2SO_3$ | 4.6 | 22.0 | 18.8 | 17.0 | 13.8 | 5.5 | 5.5 |
| $Na_2S_2O_3$ | 2.3 | 10.5 | 23.8 | 30.8 | 33.0 | 35.3 | 33.0 |
| $Na_2SO_4$ | 0.0 | 1.8 | 24.7 | 40.7 | 47.1 | 54.5 | 58.6 |
| $Na_2S$ | 88.5 | 70.2 | 33.0 | 11.9 | 4.1 | 1.4 | 0.00 |

EXAMPLE 3

To 7.1 liters of green liquor from combustion of neutral sodium sulfite pulping liquor in the digester was added 90.3 grams of NaOH and an initial oxygen pressure head corresponding to 90 percent of the amount needed to oxidize the $Na_2S$ to $Na_2SO_3$. The pH of the liquor before the addition of the NaOH was 13.1 and the pH of the liquor after the NaOH addition was 13.5. The digester was heated with 170 p.s.i.g. steam to 240° F. in 5 minutes, 305° F. in 15 minutes, 328° F. in 30 minutes, 337° F. in 60 minutes and 338° F. in 90 and 120 minutes. The total pressure varied from 58 p.s.i.g. at 5 minutes to 98 p.s.i.g. at 45 minutes. The results are expressed as pounds per gallons of $Na_2O$ in Table 6.

TABLE 6

| Component | NaO–O₂–Liquor reaction time in minutes | | | | | | | |
|---|---|---|---|---|---|---|---|---|
| | 0 | 5 | 15 | 30 | 45 | 60 | 90 | 120 |
| Na₂S | 0.209 | 0.166 | 0.103 | 0.059 | 0.025 | 0.008 | 0.000 | 0.001 |
| Na₂S₂O₃ | 0.026 | 0.044 | 0.064 | 0.080 | 0.090 | 0.095 | 0.090 | 0.090 |
| Na₂SO₃ | 0.009 | 0.015 | 0.035 | 0.044 | 0.045 | 0.039 | 0.032 | 0.028 |
| Na₂CO₃ | 0.453 | 0.453 | 0.453 | 0.453 | 0.453 | 0.453 | 0.453 | 0.453 |
| NaOH | 0.012 | 0.030 | 0.054 | 0.058 | 0.063 | 0.072 | 0.067 | 0.060 |
| Na₂SO₄ | 0.000 | 0.001 | 0.000 | 0.015 | 0.033 | 0.042 | 0.067 | 0.077 |
| Total | 0.709 | 0.709 | 0.709 | 0.709 | 0.709 | 0.709 | 0.709 | 0.709 |

In Table 7 is st forth the analysis for Na₂SO₃, Na₂SO₄, Na₂S, and Na₂S₂O₃ from Table 6 as a percentage of the original Na₂S.

TABLE 7

| Component | Percent conversion in minutes | | | | | | | |
|---|---|---|---|---|---|---|---|---|
| | 0 | 5 | 15 | 30 | 45 | 60 | 90 | 120 |
| Na₂SO₃ | 2.3 | 5.2 | 14.5 | 18.7 | 19.2 | 16.4 | 13.1 | 11.2 |
| Na₂SO₄ | 0.0 | 0.0 | 0.0 | 7.0 | 15.4 | 19.6 | 36.0 | 36.0 |
| Na₂S₂O₃ | 0.0 | 17.3 | 37.4 | 46.7 | 53.6 | 60.3 | 50.9 | 52.8 |
| Na₂S | 97.7 | 77.5 | 49.1 | 27.6 | 11.7 | 37. | 0.0 | 0.0 |

EXAMPLE 4

The oxidation experiment conditions for this run was as described in Example 1 except that the green liquor was preheated to 300° F. and the oxygen was added to 40 p.s.i.g. during the oxidation. The temperature during the run was maintained at 300° F. The results of oxidation of the green liquor components expressed in pounds per gallon of Na₂O is set forth in Table 8.

TABLE 8

| Component | Amount present as measured time in minutes | | | | | |
|---|---|---|---|---|---|---|
| | 0 | 5 | 15 | 30 | 45 | 60 |
| Na₂S | 0.214 | 0.163 | 0.135 | 0.110 | 0.092 | 0.076 |
| Na₂S₂O₃ | 0.024 | 0.038 | 0.048 | 0.055 | 0.060 | 0.069 |
| Na₂SO₃ | 0.008 | 0.020 | 0.026 | 0.029 | 0.031 | 0.034 |
| Na₂CO₃ | 0.453 | 0.453 | 0.453 | 0.453 | 0.453 | 0.453 |
| Na₂SO₄ | 0.000 | 0.025 | 0.037 | 0.052 | 0.063 | 0.067 |

EXAMPLE 5

The procedure set forth in Example 4 was followed in this example, with the added step that 2 percent by volume of glycerine was added to the green liquor. The percent conversion data obtained for this run is set forth in Table 9.

TABLE 9

Percent Conversion in Minutes

| Component | 0 | 5 | 15 | 30 | 45 | 60 |
|---|---|---|---|---|---|---|
| Na₂SO₃ | 1.9 | 2.8 | 4.2 | 5.6 | 4.2 | 5.6 |
| Na₂SO₄ | 0.0 | 13.1 | 28.5 | 35.5 | 37.8 | 37.8 |
| Na₂S₂O₃ | 0.0 | 14.9 | 22.0 | 26.7 | 30.5 | 31.4 |
| Na₂S | 98.1 | 69.2 | 45.3 | 32.2 | 27.5 | 25.2 |

14-A

The sulfur dioxide content of the recovery furnace flue gases or, alternatively, of the power boiler flue gases, may be easily scrubbed from these gasses by treating them with such oxidized liquor in equipment well known and available to the prior art, such as a packed tower or a spray scrubber. See, for example, Haslam, Ryan and Weber, Trans. A. Inst. Chem. Engrs., 15, 177 (1923); Johnstone and Singh, Ind. Eng. Chem. 29, 286 (1937); and Collins, Paper Ind. 29, No. 5: 680, No. 6: 830, No. 7: 984 (1947). The flue gases referred to hereinabove are treated with the oxidized liquor produced according to the mode or manner of this invention as exemplified in the above Examples 1 through 5.

Because various modifications may be made in the present invention without departing from the spirit of the invention, it is intended that the information contained in the foregoing specification be interpreted merely as illustrative and not in a limiting manner.

We claim:

1. A process for absorbing SO₂ from furnace flue gases comprising the steps of:
   1. oxidizing green liquor from a spent neutral sulfite pulping liquor using heat and pressure to oxidize the sodium sulfide in the green liquor to thereby obtain an oxidized green liquor comprising sodium sulfate, sodium sulfite, sodium thiosulfate, sodium hydroxide and sodium carbonate, there being at least about 3 percent by weight but less than about 30 percent of the sodium sulfide converted to sodium sulfite, and
   2. scrubbing furnace flue gases containing SO₂ with the oxidized green liquor of Step 1 to absorb the SO₂.

2. A process as defined in claim 1 in which at least 15 percent but less than 70 percent of the sodium sulfide has been converted to sodium sulfate.

3. A process as defined in claim 1 in which the green liquor has the following approximate composition:

| COMPONENT | MOLAR PERCENT (Based on Na₂O) |
|---|---|
| Na₂S | 38.02 |
| Na₂S₂O₃ | 1.83 |
| Na₂SO₃ | 0.73 |
| Na₂CO₃ | 59.41 | and the oxidizing time in Step 1 is about 15 to 60 minutes.

4. A process as defined in claim 3 in which the oxidized green liquor has the following approximate composition:

| COMPONENT | MOLAR PERCENT (Based on Na₂O) |
|---|---|
| Na₂S | 0.85 |
| Na₂S₂O₃ | 10.54 |
| Na₂SO₃ | 1.19 |
| Na₂CO₃ | 62.41 |
| Na₂SO₄ | 19.80 |
| NaOH | 5.21 |

5. A process as defined in claim 1 in which green liquor is oxidized in Step 1 at a temperature from about 70° F. to 370° F. and a pressure of about 20 to 200 p.s.i.

* * * * *